(12) United States Patent
Gonnon et al.

(10) Patent No.: US 7,030,184 B2
(45) Date of Patent: *Apr. 18, 2006

(54) METHOD FOR IMPROVING THE MECHANICAL STRENGTH OF CEMENT MATRICES, AND CEMENT MATRICES PRODUCED THEREBY

(75) Inventors: Pascal Gonnon, Villeneuve (FR); Yves Kensicher, Lozanne (FR); Christian Jacquemet, Lyons (FR)

(73) Assignee: COATEX, S.A.S., Genay (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 13 days.

This patent is subject to a terminal disclaimer.

(21) Appl. No.: 10/670,360

(22) Filed: Sep. 26, 2003

(65) Prior Publication Data

US 2004/0116556 A1 Jun. 17, 2004

Related U.S. Application Data

(63) Continuation of application No. 09/983,653, filed on Oct. 25, 2001, now Pat. No. 6,752,866.

(30) Foreign Application Priority Data

Oct. 25, 2000 (FR) .................................. 00 13660

(51) Int. Cl.
  *C08K 3/26* (2006.01)

(52) U.S. Cl. .................... 524/552; 524/5; 524/556; 524/425; 524/426; 524/447; 524/448; 106/719; 106/727; 106/638; 106/721

(58) Field of Classification Search ................ 106/727, 106/719, 638; 524/507, 558, 511, 525, 425, 524/426, 552, 5, 556

See application file for complete search history.

(56) References Cited

U.S. PATENT DOCUMENTS

| 4,686,252 | A | * | 8/1987 | Burge et al. .................. 524/3 |
| 6,057,398 | A | * | 5/2000 | Blum ......................... 524/507 |
| 6,402,831 | B1 | | 6/2002 | Sawara et al. |
| 6,660,799 | B1 | | 12/2003 | Kensicher et al. |
| 6,752,866 | B1 | * | 6/2004 | Gonnon et al. ............. 106/727 |

OTHER PUBLICATIONS

J. A. Brysdon, pLastics Materials, Butterworths Scientific, 4th ed., pp-698.*
J. A. Brydson, Plastics Materials, Butterworths Scientific, $4^{th}$ Edition, pp. 698.

* cited by examiner

*Primary Examiner*—David W. Wu
*Assistant Examiner*—Satya B. Sastri
(74) *Attorney, Agent, or Firm*—Oblon, Spivak, McClelland, Maier & Neustadt, P.C.

(57) ABSTRACT

The mechanical property known as "strength at young ages" of cement matrices or hydraulic binders may be significantly improved by adding dispersions of mineral fillers and dispersing agents. The dispersing agents of the present invention comprise copolymers prepared by the radical copolymerization of at least one alkoxy-, aryloxy-, alkylaryloxy- or arylalkyloxy-polyalkylene glycol ethylenic urethane monomer with at least one anionic monomer and at least one non-ionic monomer, and optionally, an alkoxy-, aryloxy-, alkylaryloxy- or arylalkyloxy-polyalkylene glycol acrylate or methacrylate or an alkyloxy-, aryloxy-, alkylaryloxy- or arylalkyloxy-polyalkylene glycol allyl ether, and/or a crosslinking agent.

54 Claims, No Drawings

METHOD FOR IMPROVING THE MECHANICAL STRENGTH OF CEMENT MATRICES, AND CEMENT MATRICES PRODUCED THEREBY

BACKGROUND OF THE INVENTION

1. Field of the Invention

The present invention relates to dispersions of mineral fillers, particularly calcium carbonates, and dispersing agents. Cement matrices or hydraulic binders, and more particularly hydraulic concretes, prepared with the dispersions of mineral fillers and dispersing agents of the present invention have an appreciably improved mechanical property known as "strength at young ages."

The present invention also relates to mortars, concretes and other compositions based on cement and/or semi-hydrate calcium sulphate, i.e., hydraulic compounds or binders.

2. Discussion of the Background

It is known that cement matrices such as concretes, mortars, grouts, etc., more particularly hydraulic concretes, are employed in two main types of applications, ready-for-use concretes and prefabricated products.

Concrete is composed essentially of a cement and an aggregate as well as water and admixtures or additives. Aggregates are classed in several categories known to experts and defined by the French standard XP P 18-540. In this standard, the families of aggregates comprise:

0/D fillers where D<2 mm, with at least 70% of the filler passing through a 0.063 mm screen, 0/D fine sands where D<1 mm, with less than 70% of the fine sand passing through a 0.063 mm screen, 0/D sands where $1 \leq D$ 6.3 mm, gravels where D>6.3 mm, d/D fine gravels where d>1 mm and D 125 mm, d/D ballasts where d>25 mm and D 50 mm, with d and D as defined in the standard.

Examples of fillers include, for example, fumed silica or siliceous additives, or calcareous additives such as calcium carbonate. It is known that calcium carbonate can be used either in the form of a dispersion in water or in an aqueous medium and not including any dispersant.

WO 99/47468 describes the use of calcium carbonate in the form of an aqueous dispersion for preparing concretes. This document describes a more or less acceptable compromise between ease of handling and resistance to premature aging. However, WO 99/47468 only describes incorporating, in the cement matrix or hydraulic binder, an additive used as a liquefier for improving fluidity, which is similar to the known functions of additives in the prior art.

EP 0 271 435, EP 0 725 043 and U.S. Pat. No. 5,614,017 describe the use of plasticizers in cements in order to improve the compressive strength, or reduce shrinkage, or increase the workability time of cement, measured with the Abrams cone, also referred to as "slump." In EP 0 271 435, the additive acts as a water reducer, in order that the water/cement (W/C) ratio be as low as possible so that the mechanical strength of the cement improves. In EP 0 725 043, the plasticizer is used at a very low concentration and the technical problem posed is completely different from that of the present invention, as with U.S. Pat. No. 5,614,017. In these three documents, the aggregate is of the 0/D filler type as defined above (D<2 mm with at least 70% of the aggregate passing through a 0.063 mm screen), the calcium carbonate is used as a dry powder rather than in dispersion, and the admixture is added at the time of preparation of the cement matrix or hydraulic binder, that is to say subsequently to, rather than before the preparation of the cement matrix or hydraulic binder, as in the present invention.

It is also known that admixtures may be used for deflocculating the cement paste and/or reducing the quantity of water in the cement. In this regard, if the proportion of water increases in a cement matrix or hydraulic binder, the mechanical strength is reduced. Experts therefore always try to reduce the water/cement W/C ratio in their formulations. However, experts also know that if the proportion of water increases in a cement matrix or hydraulic binder, the workability of the cement matrix or hydraulic binder (that is to say its ability to be handled, pumped, etc) increases. Experts are therefore very often forced to seek a compromise between the mechanical properties of the cement, and its workability.

Among the mechanical properties of cement matrices or hydraulic binders, one of the most important properties for experts concerns "strength at young ages." This property is defined as the change in the compressive strength curve, as a function of the age of preparation of the cement matrix or hydraulic binder, in the time period of from 0 hours to 7 days following the preparation of the cement matrix or hydraulic binder, in particular, measured at a standard time of 2 days and 7 days.

In the prior art, as discussed above, this property cannot be improved, but must be a compromise with other properties. Like any compromise, it is not satisfactory. There is therefore an important and recognized need for significantly increasing the property of strength at young ages, without negatively affecting other desired properties, such as, for example, workability.

SUMMARY OF THE INVENTION

Accordingly, it is an object of the present invention to provide a method of preparing a cement matrix or hydraulic binder comprising adding a dispersion of a mineral filler and at least one dispersing agent to the cement matrix or hydraulic binder.

It is another object of the present invention to provide a cement matrix or hydraulic binder prepared by the method of the present invention.

It is yet a third object of the present invention to provide a concrete, mortar, hydraulic concrete, grout, or composition based on cement and/or calcium sulphate hemihydrate.

It is a fourth object of the present invention to provide a building, bridge, road, petroleum cement, or offshore construction comprising the cement matrix or hydraulic binder of the present invention.

DETAILED DESCRIPTION OF THE INVENTION

Thus, in a first embodiment, the present invention provides a method of preparing a cement matrix or hydraulic binder comprising preparing an aqueous dispersion comprising a mineral filler and a dispersing agent comprising a copolymer prepared by the radical copolymerization of at least one alkoxy-, aryloxy-, alkylaryloxy- or arylalkyloxy-polyalkylene glycol ethylenic urethane monomer with at least one anionic monomer and at least one non-ionic monomer, then adding the aqueous dispersion to a cement or hydraulic binder.

Although the mechanism of action of the dispersion of the present invention, in combination with the other ingredients, is not known, it considerably increases the mechanical strength, and in particular the strength at young ages, of the cement or hydraulic binder. The dispersion of mineral filler of the present invention is prepared by adding special dispersing agents to the dispersion of the filler. In other words, the dispersing agent or agents are not incorporated directly in the cement matrix or hydraulic binder.

The present invention therefore relates to a method for preparing cement matrices or hydraulic binders such as concretes, mortars, grouts or compositions based on semihydrate calcium sulphate, having improved mechanical strength, in particular, improved mechanical strength at young ages. The dispersion of mineral filler contains the special dispersing agent according to the present invention.

French patent application N° 9905665 of the Applicant (unpublished at the time of filing the present application) describes a copolymer family in which the copolymers very appreciably improve the workability of hydraulic binders.

However, experts would not consider such workability agents as a dispersing agents, in the preparation of mineral filler dispersions used in the manufacture of cement matrices or hydraulic binders. Likewise, the prior art does not suggest preparing a cement matrix with dispersions containing a special dispersing agent.

The polymeric dispersing agents of the present invention, provide cement matrices or hydraulic binders, for example, concretes, mortars, grouts or compositions based on calcium sulphate hemihydrate, with improved mechanical strength, and in particular an improved mechanical strength at young ages. The dispersing agents of the present invention include, for example, copolymers obtained by the radical copolymerisation of at least one alkoxy-, aryloxy-, alkylaryloxy-, arylalkyloxy- or alkoxy-polyalkylene glycol ethylenic urethane monomer, and more particularly, an alkoxy-, aryloxy-, alkylaryloxy- or arylalkyloxy-polyethylene glycol urethane, with at least one anionic monomer and at least one non-ionic monomer, optionally in the presence of an alkoxy-, aryloxy-, alkylaryloxy- or arylalkyloxy-polyalkylene glycol acrylate or methacrylate or an alkyloxy-, aryloxy-, alkylaryloxy- or arylalkyloxy-polyalkylene glycol allyl ether, and more particularly methoxy-polyethylene glycol acrylate or methacrylate, where the PEG (polyethylene glycol) has a molecular weight greater than 300, and also optionally in the presence of ethylenic monomers having at least two polymerizable double bonds, also referred to as cross-linking agents.

The novel copolymer of the present invention for improving the strength at young ages of cement matrices or hydraulic binders may prepared by known processes of radical copolymerization in solution, emulsion polymerization, suspension polymerization, or by precipitation of a mixture of the aforementioned monomers, in the presence of a catalytic system and known transfer agents. The monomers, catalysts, and transfer agents may be used in the appropriate quantities, and the molecular weight of the copolymer may be adjusted using known methods, such as, for example, adjusting the temperature, the level of catalyst, the presence or absence of transfer agents or any other method or combination of methods known to experts.

The polymerization catalyt system may vary in quantity (by weight) between 0.1% and 20% with respect to the total mass of monomers. The catalyst system is preferably selected from among those which are water-soluble, such as, for example, sodium, potassium or ammonium persulphates, azo compounds, peroxides, or hydroperoxides, in particular hydrogen peroxide, and optionally combined with a known reducing agent such as, for example, sodium metabisulphite, sodium hypophosphite, phosphorous acid, hypophosphorous acid or metallic salts.

The chain transfer agent is preferably chosen from among the alkyl-mercaptans, for example, octanethiol, decanethiol, n-dodecanethiol or t-dodecanethiol, or from among mercapto-propionic acid, mercapto-succinic acid, thioglycolic acid or mercaptoethanol or the secondary alcohols, certain alkyl halides or the salts of phosphorus acids with an oxidation number less than 5, as well as various other additives known to experts, as chain limiters.

Throughout the present application, the following abbreviations are used:

$EGMAPO_4$=ethylene glycol methacrylate phosphate
EGMA=ethylene glycol methacrylate
PEG 350=polyethylene glycol with a molecular weight of 350
PEG 750=polyethylene glycol with a molecular weight of 750
and by analogy any number following the letters PEG indicates the molecular weight of the PEG.
EA=ethyl acrylate
Acryl=acrylamide
MAA=methacrylic acid
AA=acrylic acid
TEA=triethanolamine
TDI=toluene diisocyanate
IPDI=isophorone diisocyanate The following monomers may be polymerized to provide the polymeric dispersing agents of the present invention:

a) at least one anionic monomer, b) at least one non-ionic monomer, c) at least one alkoxy-, aryloxy-, alkylaryloxy- or arylalkyloxy-polyalkylene glycol ethylenic urethane monomer, sometimes referred to as a special urethane monomer, d) optionally an alkoxy-, aryloxy-, alkylaryloxy- or arylalkyloxy-polyalkylene glycol acrylic or methacrylic ester, or an alkoxy-, aryloxy-, alkylaryloxy- or arylalkyloxy-polyalkylene glycol allyl ether, e) optionally one or more ethylenic monomers having at least two polymerizable double bonds, and referred to as cross-linking agents.

Preferably, the copolymer dispersing agent of the present invention provides an improvement in the compressive strength of cement matrices or hydraulic binders, and contains:

a) 1% to 50% by weight of one or more anionic monomers, b) 2% to 65% by weight of one or more non-ionic monomers, c) 3% to 65% by weight of an alkoxy-, aryloxy-, alkylaryloxy- or arylalkyloxy-polyalkylene glycol ethylenic urethane monomer, d) 0% to 90% by weight of an alkyloxy-, aryloxy-, alkylaryloxy- or arylalkyloxy-polyalkylene glycol acrylate or methacrylate, or an alkoxy-, aryloxy-, alkylaryloxy- or arylalkyloxy-polyalkylene glycol allyl ether, and in particular a methoxy-polyethylene glycol acrylate or methacrylate, the said PEG having a molecular weight greater than 300, e) 0% to 5% by weight of one more cross-linking agents, and the total amount of monomers a), b), c), d) and e) is equal to 100%.

The anionic monomer or monomers are selected from among acrylic acid, methacrylic acid, 2-acrylamido-2-methyl-1-propane sulphonic acid, 2-methacrylamido-2-methyl-1-propane sulphonic acid, 3-methacrylamido-2-hydroxy-1- propane sulphonic acid, allylsulphonic acid, methallylsulphonic acid, allyloxybenzene sulphonic acid, methallyloxybenzene sulphonic acid, 2-hydroxy-3-(2-propenyloxy)propane sulphonic acid, 2-methyl-2-propene-1-sulphonic acid, ethylene sulphonic acid, propene sulphonic acid, 2-methyl propene sulphonic acid, styrene sulphonic acid, vinyl sulphonic acid, sodium methallylsulphonate, sulphoethyl or sulphopropyl acrylate or methacrylate, sulphomethylacrylamide, sulphomethylmethacrylamide, alkylene glycol acrylate or methacrylate phosphate or phosphonate or sulphate or sulphonate, itaconic acid, maleic anhydride, sodium methallylsulphonate or styrene sulphonic acid and more particularly selected from among acrylic acid, methacrylic acid, 2-acrylamido methyl-1-propane sulphonic acid, ethylene glycol methacrylate phosphate or ethylene glycol acrylate phosphate.

The non-ionic monomer or monomers are selected from among acrylamide or methacrylamide or derivatives thereof, $C_1$ to $C_{40}$ acrylic or methacrylic acid alkyl-esters, alkoxy-, aryloxy-, alkylaryloxy- or arylalkyloxy-acrylates or oxyalkyl, oxyaryl, oxyalkylaryl or oxyarylalkyl methacrylates (the alkylene, arylene, alkylarylene or arylalkylene oxide number being between 1 and 120), vinyl acetate, vinylpyrrolidone, styrene or α-methylstyrene and more particularly from among ethyl acrylamide or acrylate.

The alkoxy-, aryloxy-, alkylaryloxy- or arylalkyloxy-polyalkylene glycol urethane monomer or monomers are selected from among the reaction products of alkoxy-polyalklyene glycol with a polymerisable unsaturated isocyanate and more particularly from among the reaction products of methoxy-PEG with an acrylic, methacrylic, vinyl or allyl isocyanate.

The cross-linking monomer or monomers are selected from among the group consisting of ethylene glycol dimethyacrylate, divinylacetylene, divinylbenzene, trimethylolpropanetriacrylate, allyl acrylate, methylene-bis-acrylamide, methylene-bis-methacrylamide, tetrallyloxyethane, the triallylcyanides or the allyl ethers obtained from polyols such as pentaerythritol, sorbitol, sucrose or others.

The polymeric dispersing agent of the present invention may, subsequent to the polymerisation step, be fractionated by the fractionation methods well-known to experts. In addition, the polymeric dispersing agent may have a completely acidic form, or be partially or completely neutralized by one or more neutralization agents having a monovalent function or a polyvalent function.

The neutralization agents having a monovalent function may be selected from the group consisting of compounds containing alkaline cations, in particular sodium, potassium, lithium, or ammonium, or may be primary or secondary aliphatic and/or cyclic amines, such as, for example, ethanolamines, mono- or diethylamine or cyclohexylamine.

The neutralization agents having a polyvalent function may be selected from the group consisting of compounds having divalent alkaline-earth cations, in particular magnesium, calcium, or zinc, and trivalent cations, particularly aluminum, or certain compounds containing cations having a higher valency (i.e., greater than trivalent).

The mineral fillers of the present invention may be selected, without limitation, from among natural calcium carbonate (chalk, calcite, marble or other natural calcium carbonate), precipitated calcium carbonate, barium carbonate, limy rocks, dolomite, talc, ground silica, silicas in general, fumed silica, fumed titanium dioxide, diatomites, iron oxides, manganese oxides, titanium dioxide, lime, kaolin, metakaolins, clays, mica, plasters, fly ash, slag, calcium sulphate, zeolites, basalt, barium sulphate, aluminium trihydroxide, or mixtures thereof. Preferably, the mineral filler is calcium carbonate.

The dispersion of the present invention may comprise a single filler, or a combination of two or more fillers. Such dispersions having a mixture of two or more fillers may be prepared either by mixing dispersions of each of the individual fillers, or by the codispersion of the fillers.

In a second embodiment, the present invention provides a cement matrix or hydraulic binder, for example concrete, mortar, grout or a composition based on cement and/or calcium sulphate hemihydrate, and more particularly a hydraulic concrete, prepared by mixing the aqueous dispersion of mineral filler and at least one polymeric dispersing agent, as described above, with a cement or hydraulic binder. The resulting cement matrix or hydraulic binder has improved strength at young ages.

In a third embodiment, the present invention provides a building, bridge, road, petroleum cement, offshore construction, which comprises the cement matrix or hydraulic binder of the present invention, as described above.

The present invention also covers all embodiments and all applications directly accessible to an expert upon reading the present application, based upon the experts own knowledge, and that provided by simple routine tests.

Having generally described this invention, a further understanding can be obtained by reference to certain specific examples which are provided herein for purposes of illustration only, and are not intended to be limiting unless otherwise specified.

EXAMPLES

Example 1

This example demonstrates the improvement to the mechanical properties of a mortar prepared mixing a natural calcium carbonate dispersion containing specific dispersing agent with cement.

For this purpose, in each of the tests of the example, the different constituents of a standard mortar with a 450 kg/m³ cement content was poured into a mortar mixer (EN 196-1) in the operating position. The composition was as follows:
  450 g of CEM I 42.5R CP2 cement from Gaurain in accordance with NF P 15-301;
  a quantity of calcium carbonate dispersion to be tested;
  the necessary quantity of water;
  a variable quantity, in grams, of standard Leucate sand (EN 196-1). This quantity of sand was added over 30 seconds and after 30 seconds of rapid stirring of the mixture of previously added constituents. After 90 seconds of mixing, the mixer was stopped in order to be able to scrape the walls of the mixer. Once the scraping of the mortar adhering to the walls had ended, the mixing was resumed for 1 minute at fast speed. Compliance with this time provided a mixing cycle which lasted for 4 minutes and was in accordance with EN 196-1. At the end of the mixing, the test pieces were formed and placed in a humid climatic chamber (EN 196-1) for between 20 and 24 hours and then removed from the molds, weighed, and placed in a storage vessel. This procedure was in accordance with EN 196-1. At the required age, these test pieces were taken from their storage chamber and then tested under bending and compression in accordance with EN 196-1.

The quantities of constituents were adjusted for each of the mortars of the different tests in order to work at constant compactness. In addition, the experiment was carried out on mortars whose rheology, measured with a mortar workability meter defined by NF P 15-412, was between 1 and 3 seconds.

Test N° 1

This test was carried out with a reference mortar having a 450 kg/m³ cement content, without calcium carbonate, having a water/cement W/C ratio of 0.55.

Test N° 2

This test was carried out with a mortar of the prior art having a 450 kg/m³ cement content, and 10%, with respect to the dry weight of cement, of a calcite powder sold under the name Betocarb™ 2, and having a W/C ratio of 0.54.

Test N° 3

This test was carried out with a mortar of the prior art having a 450 kg/m³ cement content, and 30%, with respect to the dry weight of cement, of a calcite in the form of powder sold under the name Betocarb™ 2, and having a W/C ratio of 0.52.

Test N° 4

This test illustrates the method of the present invention. A mortar according to the present invention, having a 450 kg/m³ cement content, a W/C ratio of 0.46, and 10% by dry weight, with respect to the dry weight of cement, of an aqueous dispersion of a calcite having 20% dry matter and a median diameter of 2 µm measured with the Sedigraph 5100, and 0.70%, by dry weight with respect to the dry weight of calcium carbonate, of a copolymer composed of:

15.0% by weight methacrylic acid;
2.0% acrylamide;
63.0% by weight methoxymethacrylate-PEG 750;
20.0% by weight methoxymethacrylurethane-PEG 750.

Using an electromagnetic stirrer with fins, the aqueous dispersion of calcium carbonate was prepared by introducing the mineral filler into the water followed by addition of the dispersant copolymer.

Test N° 5

This test illustrates the method of the present invention. A mortar according to the present invention, having a 450 kg/m³ cement content, a W/C ratio of 0.41, and 30% by dry weight, with respect to the dry weight of cement, of an aqueous dispersion of a calcite having 45% dry matter and a median diameter of 2 µm measured with the Sedigraph 5100, and 0.70%, by dry weight with respect to the dry weight of calcium carbonate, of the same copolymer as that used in Test N° 4.

The procedure and the equipment used for the dispersion of the calcium carbonate were identical to those of Test N° 4.

The results of the compressive strength measurements at 2 days, 7 days, 28 days and 90 days for the different tests are set forth in Table I below.

90 days) is significantly improved by the dispersion of calcium carbonate containing the special dispersing agent of the present invention, and more particularly, the strength at young ages (strength at 2 days and 7 days) property is improved.

Example 2

This example demonstrates, with a standard mortar having a 450 kg/m³ cement content, the influence of increasing quantities (from 15% to 60% by weight of the cement, in steps of 15%) of a dispersion of calcium carbonate with a median diameter of 2.53 µm, measured by means of a Sedigraph 5100 granulometer, and with 0.7% of the dispersing agent of Test N° 4.

The dispersion replaced volumes of water and sand so that the mortar had constant compactness. In addition, the experiment was carried out with mortars whose rheology, measured on the workability meter, was between 1 and 3 seconds, according to the same procedure as that of the previous example.

Test N° 6

This test was carried out with a reference mortar having a 450 kg/m³ cement content, without calcium carbonate, having a water/cement W/C ratio of 0.55.

Test N° 7

This test illustrates the method of the present invention. A mortar according to the present invention, having a 450 kg/m³ cement content, a W/C ratio of 0.46, and 15% by dry weight, with respect to the dry weight of cement, of the aqueous dispersion of calcium carbonate described above, having a median diameter of 2.53 µm.

The procedure and the equipment used for the dispersion of the calcium carbonate were identical to those of Test N° 4.

Test N° 8

This test illustrates the method of the present invention. A mortar according to the present invention, having a 450 kg/m³ cement content, a W/C ratio of 0.43 and 30% by dry weight, with respect to the dry weight of cement, of the aqueous dispersion of calcium carbonate described above, with a median diameter of 2.53 µm.

The procedure and the equipment used for the dispersion of the calcium carbonate were identical to those of Test N° 4.

Test N° 9

This test illustrates the method of the present invention. A mortar according to the present invention, having a 450

TABLE I

| TEST N° | REFERENCE 1 | PRIOR ART 2 | PRIOR ART 3 | INVENTION 4 | INVENTION 5 |
|---|---|---|---|---|---|
| Weight of cement in g | 450 | 450 | 450 | 450 | 450 |
| Weight of sand in g | 1580 | 1534 | 1475 | 1533 | 1539 |
| Weight of calcium carbonate in g | 0 | 45 | 135 | 45 | 155 |
| Effective addition of water in g | 242 | 242 | 234 | 208 | 187 |
| Effective water/cement ratio | 0.54 | 0.54 | 0.52 | 0.46 | 0.41 |
| Workability in seconds | 2.59 | 2.38 | 2.43 | 2.88 | 2.57 |
| Compressive strength in kN at 2 days | 39.7 | 41.5 | 51.8 | 61.1 | 85.9 |
| Compressive strength in kN at 7 days | 64.5 | 67.5 | 77.2 | 83.2 | 116.2 |
| Compressive strength in kN at 28 days | 82.6 | — | — | 99.1 | 123.6 |
| Compressive strength in kN at 90 days | 92.5 | — | — | 107.4 | 133.1 |
| Gain in strength in % at 2 days | 0 | 4.6 | 31 | 54 | 121 |
| Gain in strength in % at 7 days | 0 | 4.7 | 20 | 29 | 73 |
| Gain in strength in % at 28 days | 0 | — | — | 20 | 50 |
| Gain in strength in % at 90 days | 0 | — | — | 16 | 44 |

The results in Table I, above, show that the compressive strength of a mortar (strength at 2 days, 7 days, 28 days and kg/m³ cement content, a W/C ratio of 0.40 and 45% by dry weight, with respect to the dry weight of cement, of the aqueous dispersion of calcium carbonate described above, with a median diameter of 2.53 μm.

The procedure and the equipment used for the dispersion of the calcium carbonate were identical to those of Test N° 4.

Test N° 10

This test illustrates the method of the present invention. A mortar according to the present invention, having a 450 kg/m³ cement content, a W/C ratio of 0.39 and 60% by dry weight, with respect to the dry weight of cement, of the aqueous dispersion of calcium carbonate described above, with a median diameter of 2.53 μm.

The procedure and the equipment used for the dispersion of the calcium carbonate were identical to those of Test N° 4.

The results of compressive strength measurements at 2 days, 7 days and 28 days for the different tests are set forth in Table II below.

196-1) for between 20 and 24 hours and then removed from the molds, weighed, and placed in a storage vessel. This procedure was in accordance with EN 196-1. At the required age, these test pieces were taken from their storage chamber and then tested under bending and compression in accordance with EN 196-1.

The quantities of constituents were adjusted for each of the mortars of the different tests in order to work at constant compactness. In addition, the experiment was carried out on mortars whose rheology, measured with a mortar workability meter defined by NF P 15-412, was between 1 and 3 seconds.

Test N° 11

This test was carried out with a reference mortar having a 450 kg/m³ cement content, without any filler, and having a water/cement W/C ratio of 0.55.

TABLE II

| TEST N° | REFERENCE 6 | INVENTION 7 | INVENTION 8 | INVENTION 9 | INVENTION 10 |
|---|---|---|---|---|---|
| Weight of cement in g | 450 | 450 | 450 | 450 | 450 |
| Weight of sand in g | 1561 | 1545 | 1534 | 1527 | 1483 |
| Weight of calcium carbonate in g | 0 | 67 | 135 | 202 | 270 |
| Effective addition of water in g | 248 | 209 | 195 | 182 | 177 |
| Effective water/cement ratio | 0.55 | 0.46 | 0.43 | 0.40 | 0.39 |
| Workability in seconds | 2.14 | 1.77 | 1.60 | 1.91 | 1.64 |
| Compressive strength in kN at 2 days | 39.4 | 68.2 | 86.2 | 85.8 | 98.2 |
| Compressive strength in kN at 7 days | 61.2 | 88.4 | 101.9 | 106.2 | 115.6 |
| Compressive strength in kN at 28 days | 77.6 | — | 116.7 | — | 132.9 |
| Gain in strength in % at 2 days | 0 | 73 | 119 | 118 | 149 |
| Gain in strength in % at 7 days | 0 | 44 | 66 | 73 | 89 |
| Gain in strength in % at 28 days | 0 | — | 50 | — | 71 |

The results in Table II, above, show that the compressive strength of a mortar is significantly improved by a dispersion of calcium carbonate containing the special dispersing agent of the present invention, even for cement matrices with a high calcium carbonate content.

Example 3

This example demonstrates the improvement to the mechanical properties of a mortar prepared with dispersions of different fillers.

For this purpose, in each of the tests of the example, the different constituents of a standard mortar with a 450 kg/m³ cement content was poured into a mortar mixer (EN 196-1) in the operating position. The composition was as follows:
  450 g of CEM I 42.5R CP2 cement from Gaurain in accordance with NF P 15-301;
  a quantity of filler dispersion to be tested (except for the reference, where no suspension is added);
  the necessary quantity of water;
  a variable quantity in grams of standard Leucate sand (EN 196-1). This quantity of sand was added over 30 seconds and after 30 seconds of rapid stirring of the mixture of previously added constituents. After 90 seconds of mixing, the mixer was stopped in order to be able to scrape the walls of the mixer. Once the scraping of the mortar adhering to the walls had ended, the mixing was resumed for 1 minute at fast speed. Compliance with this time provided a mixing cycle which lasted for 4 minutes and was in accordance with EN 196-1. At the end of the mixing, the test pieces were formed and placed in a humid climatic chamber (EN Test N° 12

This test illustrates the method of the present invention. A mortar according to the present invention, having a 450 kg/m³ cement content, a W/C ratio of 0.59 and 10% by dry weight, with respect to the dry weight of cement, of an aqueous dispersion of fumed silica with a 58.2% dry matter content obtained by dispersing, in water, a fumed silica with a median diameter equal to 8.99 μm, measured with the Sedigraph 5100, and 0.75%, by dry weight with respect to the dry weight of fumed silica, of a totally sodium neutralized copolymer composed of:
  5.0% by weight methacrylic acid,
  2.0% by weight acrylamide,
  80.0% by weight methoxy-PEG 750 methacrylate,
  13.0% by weight methoxy-PEG 750 methacrylurethane.

The procedure and the equipment used for the dispersion of the fumed silica were identical to those of Test N° 4.

Test N° 13

This test illustrates the method of the present invention. A mortar according to the present invention, having a 450 kg/m³ cement content, a W/C ratio of 0.60 and 30% by dry weight, with respect to the dry weight of cement, of an aqueous dispersion of mixed calcium carbonate-talcum (75%-25% by weight) with a 60% dry matter content, obtained by dispersing, in water, a mixture of calcium carbonate-talcum (75%-25% by weight) with a median diameter equal to 10 μm, measured with the Sedigraph 5100, by means of 2.5%, by dry weight with respect to the dry weight of the mixture of calcium carbonate-talcum (75%-25% by weight), of a totally soda neutralized copolymer composed of:
  5.0% by weight methacrylic acid,
  2.0% by weight acrylamide, 80.0% by weight methoxy-PEG 750 methacrylate,
13.0% by weight methoxy-PEG 750 methacrylurethane.

The procedure and the equipment used for the dispersion of the mixed calcium carbonate-talcum are identical to those of Test N° 4.

Test N° 14

This test illustrates the method of the present invention. A mortar according to the present invention, having a 450 kg/m³ cement content, a W/C ratio of 0.48 and 30% by dry weight, with respect to the dry weight of cement, of an aqueous dispersion of chalk with a 59.9% dry matter content obtained by dispersing, in water, a chalk having a granulometry such that 43.7% of the particles have a diameter of less than 2 μm and 14.2% of the particles have a diameter less than 1 μm, measured with the Sedigraph 5100, and 0.30%, by dry weight with respect to the dry weight of chalk, of a non neutralized copolymer composed of:
  5.0% by weight methacrylic acid,
  2.0% by weight acrylamide,
  80.0% by weight methoxy-PEG 750 methacrylate,
  13.0% by weight methoxy-PEG 750 methacrylurethane.

The procedure and the equipment used for the dispersion of the chalk are identical to those of Test N° 4.

Test N° 15

This test illustrates the method of the present invention. A mortar according to the present invention, having a 450 kg/m³ cement content, a W/C ratio of 0.52 and 30% by dry weight, with respect to the dry weight of cement, of an aqueous dispersion of precipitated calcium carbonate (PCC) having a 59.8% dry matter content obtained by dispersing, in water, a PCC with a granulometry such that 69.4% of the particles have a diameter less than 2 μm and 38.8% of the particles have a diameter less than 1 μm, measured with the Sedigraph 5100, and 0.80%, by dry weight with respect to the dry weight of PCC, of a 50 mol. % triethanolamine neutralized copolymer composed of:
  5.0% by weight methacrylic acid,
  2.0% by weight acrylamide,
  80.0% by weight methoxy-PEG 750 methacrylate,
  13.0% by weight methoxy-PEG 750 methacrylurethane.

The procedure and the equipment used for the dispersion of the PCC are identical to those of Test N° 4.

Test N° 16

This test illustrates the method of the present invention. A mortar according to the present invention, having a 450 kg/m³ cement content, a W/C ratio of 0.52 and 30% by dry weight, with respect to the dry weight of cement, of an aqueous dispersion of dolomite having a 59.5% dry matter content obtained by dispersing, in water, a dolomite with a granulometry such that 20.5% of the particles have a diameter less than 2 μm and 11.8% of the particles have a diameter less than 1 μm, measured with the Sedigraph 5100, and 0.80%, by dry weight with respect to the dry weight of dolomite, of a 85 mol. % ammonia neutralized copolymer composed of:
  5.0% by weight methacrylic acid,
  2.0% by weight acrylamide,
  80.0% by weight methoxy-PEG 750 methacrylate,
  13.0% by weight methoxy-PEG 750 methacrylurethane.

The procedure and the equipment used for the dispersion of the dolomite are identical to those of Test N° 4.

Test N° 17

This test illustrates the method of the present invention. A mortar according to the present invention, having a 450 kg/m³ cement content, a W/C ratio of 0.50 and 30% by dry weight, with respect to the dry weight of cement, of an aqueous dispersion of silica with a 58.2% dry matter content obtained by dispersing, in water, a silica with a median diameter equal to 10.51 μm measured with the Sedigraph 5100, and 0.50%, by dry weight with respect to the dry weight of silica, of a totally lithium neutralized copolymer composed of:
  5.0% by weight methacrylic acid,
  2.0% by weight acrylamide,
  80.0% by weight methoxy-PEG 750 methacrylate,
  13.0% by weight methoxy-PEG 750 methacrylurethane.

The procedure and the equipment used for the dispersion of the silica are identical to those of Test N° 4.

Test N° 18

This test illustrates the method of the present invention. A mortar according to the present invention, having a 450 kg/m³ cement content, a W/C ratio of 0.56 and 10% by dry weight, with respect to the dry weight of cement, of an aqueous dispersion of zeolite with a 30.6% dry matter content obtained by dispersing, in water, a zeolite with a median diameter equal to 2,57 μm, measured with the Sedigraph 5100, and 0.50%, by dry weight with respect to the dry weight of zeolite, of a totally soda neutralized copolymer composed of:
  5.0% by weight methacrylic acid,
  2.0% by weight acrylamide,
  80.0% by weight methoxy-PEG 750 methacrylate,
  13.0% by weight methoxy-PEG 750 methacrylurethane.

The procedure and the equipment used for the dispersion of the zeolite are identical to those of Test N° 4.

Test N° 19

This test illustrates the method of the present invention. A mortar according to the present invention, having a 450 kg/m³ cement content, a W/C ratio of 0.68 and 30% by dry weight, with respect to the dry weight of cement, of an aqueous dispersion of zeolite with a 30.6% dry matter content obtained by dispersing, in water, a zeolite with a median diameter equal to 2.57 μm, measured with the Sedigraph 5100, and 0.50%, by dry weight with respect to the dry weight of zeolite, of a totally soda neutralized copolymer composed of:
  5.0% by weight methacrylic acid,
  2.0% by weight acrylamide,
  80.0% by weight methoxy-PEG 750 methacrylate,
  13.0% by weight methoxy-PEG 750 methacrylurethane.

The procedure and the equipment used for the dispersion of the zeolite are identical to those of Test N° 4.

Test N° 20

This test illustrates the method of the present invention. A mortar according to the present invention, having a 450 kg/m³ cement content, a W/C ratio of 0.61 and 30% by dry weight, with respect to the dry weight of cement, of an aqueous dispersion of fly ash with a 39.2% dry matter content obtained by dispersing, in water, a fly ash with a median diameter equal to 17.69 μm, measured with the Sedigraph 5100, and 0.50%, by dry weight with respect to the dry weight of fly ash, of a totally soda neutralized copolymer composed of:
  5.0% by weight methacrylic acid,
  2.0% by weight acrylamide,
  80.0% by weight methoxy-PEG 750 methacrylate,
  13.0% by weight methoxy-PEG 750 methacrylurethane.

The procedure and the equipment used for the dispersion of the fly ash are identical to those of Test N° 4.

Test N° 21

This test illustrates the method of the present invention. A mortar according to the present invention, having a 450 kg/m³ cement content, a W/C ratio of 0.68 and 30% by dry weight, with respect to the dry weight of cement, of an aqueous dispersion of diatomite with a 42.2% dry matter content obtained by dispersing, in water, a diatomite with a median diameter equal to 33.32 μm, measured with the Sedigraph 5100, and 0.50%, by dry weight with respect to the dry weight of diatomite, of a totally soda neutralized copolymer composed of:
  5.0% by weight methacrylic acid,
  2.0% by weight acrylamide,
  80.0% by weight methoxy-PEG 750 methacrylate,
  13.0% by weight methoxy-PEG 750 methacrylurethane.

The procedure and the equipment used for the dispersion of the diatomite are identical to those of Test N° 4.

Test N° 22

This test illustrates the method of the present invention. A mortar according to the present invention, having a 450 kg/m³ cement content, a W/C ratio of 0.57 and 30% by dry weight, with respect to the dry weight of cement, of an aqueous dispersion of metakaolin with a 33.6% dry matter content obtained by dispersing, in water, a metakaolin with a median diameter equal to 5.24 μm, measured with the Sedigraph 5100, and 0.50%, by dry weight with respect to the dry weight of metakaolin, of a mixture composed of 90% by weight of a totally magnesium neutralized copolymer composed of:
  5.0% by weight methacrylic acid,
  2.0% by weight acrylamide,
  80.0% by weight methoxy-PEG 750 methacrylate,
  13.0% by weight methoxy-PEG 750 methacrylurethane,
  and 10% by weight of a surfactant commercialized by BASF under the trade name Pluronic™ PE 3100.

The procedure and the equipment used for the dispersion of the metakaolin are identical to those of Test N° 4.

Test N° 23

This test illustrates the method of the present invention. A mortar according to the present invention, having a 450 kg/m³ cement content, a W/C ratio of 0.56 and 30% by dry weight, with respect to the dry weight of cement, of an aqueous dispersion of slag with a 52.4% dry matter content obtained by dispersing, in water, a slag with a median diameter equal to 33.71 μm, measured with the Sedigraph 5100, and 0.50%, by dry weight with respect to the dry weight of slag, of a totally soda neutralized copolymer composed of:
  5.0% by weight methacrylic acid,
  2.0% by weight acrylamide,
  80.0% by weight methoxy-PEG 750 methacrylate,
  13.0% by weight methoxy-PEG 750 methacrylurethane.

The procedure and the equipment used for the dispersion of the slag are identical to those of Test N° 4.

The results of compression strength measurements at 2 days, determined by the same method as described in the previous examples, are set forth in Tables IIIa and IIIb, below.

TABLE IIIa

| TEST N° | REFERENCE 11 | INVENTION 12 | INVENTION 13 | INVENTION 14 | INVENTION 15 | INVENTION 16 |
|---|---|---|---|---|---|---|
| Weight of cement in g | 450 | 450 | 450 | 450 | 450 | 450 |
| Weight of sand in g | 1569 | 1487 | 1388 | 1436 | 1355 | 1485 |
| Weight of mineral dispersion or slurry in g | 0 | 181 | 229 | 225 | 226 | 226 |
| Effective addition of water in g | 248 | 267 | 269 | 214 | 233 | 234 |
| Effective water/cement ratio | 0.55 | 0.59 | 0.60 | 0.48 | 0.52 | 0.52 |
| Compression strength in kN at 2 days | 40 | 40.2 | 42.2 | 60.2 | 52.6 | 40.1 |
| Gain in strength in % at 2 days | 0 | 0.5 | 5 | 50 | 31 | 0.3 |

TABLE IIIb

| TEST N° | INVENTION 17 | INVENTION 18 | INVENTION 19 | INVENTION 20 | INVENTION 21 | INVENTION 22 | INVENTION 23 |
|---|---|---|---|---|---|---|---|
| Weight of cement in g | 450 | 450 | 450 | 450 | 450 | 450 | 450 |
| Weight of sand in g | 1499 | 1494 | 1348 | 1406 | 1395 | 1490 | 1443 |
| Weight of mineral dispersion or slurry in g | 232 | 147 | 441 | 344 | 319 | 134 | 258 |
| Effective addition of water in g | 225 | 252 | 306 | 275 | 246 | 257 | 252 |
| Effective water/cement ratio | 0.50 | 0.56 | 0.68 | 0.61 | 0.55 | 0.57 | 0.56 |
| Compressive strength in kN at 2 days | 47.7 | 52.6 | 44.4 | 45.4 | 51.6 | 43.1 | 44.8 |
| Gain in strength in % at 2 days | 19 | 31 | 11 | 13 | 29 | 8 | 12 |

The results in Tables IIIa and IIIb, above, show that that the compression strength, at young ages, of a mortar (i.e., strength at 2 days) is significantly improved by a dispersion or slurry of different fillers with different types of dispersing agent according to the present invention.

One of skill in the art, who has read the previous examples relating to a mortar, could reliably predict that the performance of concretes comprising the same mortars, with an addition of gravel, would also be improved in a similar manner. Likewise, grouts prepared according to the method of the present invention (i.e., mortars without sand) would also be expected to have improved properties.

The priority document of the present application, French application 00 13660, filed Oct. 25, 2000, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed as new and is intended to be secured by Letters Patent is:

1. A method of preparing a cement matrix or hydraulic binder comprising:
    preparing an aqueous dispersion comprising a mineral filler and a dispersing agent, and
    adding the aqueous dispersion to a cement or hydraulic binder,
    wherein the dispersing agent comprises a copolymer prepared by the radical copolymerization of at least one alkoxy-, aryloxy-, alkylaryloxy- or arylalkyloxy-polyalkylene glycol ethylenic urethane monomer with at least one anionic monomer; at least one non-ionic monomer; and at least one alkoxy-, aryloxy-, alkylaryloxy- or arylalkyloxy-polyalkylene glycol acrylate or methacrylate or an alkyloxy-, aryloxy-, alkylaryloxy- or arylalkyloxy-polyalkylene glycol allyl ether.

2. The method according to claim 1, wherein the urethane monomer is an alkoxy-polyethylene glycol urethane.

3. The method according to claim 1, wherein the copolymer further comprises ethylenic monomers having at least two polymerizable double bonds.

4. The method according to claim 1, wherein the dispersing agent is a copolymer comprising:
    a) 1% to 50% by weight of one or more anionic monomers;
    b) 2% to 65% by weight of one or more non-ionic monomers;
    c) 3% to 65% by weight of an alkoxy-, aryloxy-, alkylaryloxy- or arylalkyloxy-polyalkylene glycol ethylenic urethane monomer;
    d) 0% to 90% by weight of an alkyloxy-, aryloxy-, alkylaryloxy- or arylalkyloxy-polyalkylene glycol acrylate or methacrylate, or an alkoxy-, aryloxy-, alkylaryloxy- or arylalkyloxy-polyalkylene glycol allyl ether;
    e) 0% to 5% by weight of one or more cross-linking agents; and
    the total of monomers a), b), c), d) and e) is equal to 100%.

5. The method according to claim 1, wherein the anionic monomer is at least one monomer selected from the group consisting of acrylic acid, methacrylic acid, 2-acrylamido-2-methyl-1-propane sulphonic acid, 2-methacrylamido-2-methyl-1-propane sulphonic acid, 3-methacrylamido-2-hydroxy-1-propane sulphonic acid, allylsulphonic acid, methallylsulphonic acid, allyloxybenzene sulphonic acid, methallyloxybenzene sulphonic acid, 2-hydroxy-3-(2-propenyloxy)propane sulphonic acid, 2-methyl-2-propene-1-sulphonic acid, ethylene sulphonic acid, propene sulphonic acid, 2-methyl propene sulphonic acid, styrene sulphonic acid, vinyl sulphonic acid, sodium methallylsulphonate, sulphoethyl or sulphopropyl acrylate or methacrylate, sulphomethylacrylamide, sulphomethylmethacrylamide, ethylene glycol methacrylate phosphate, and ethylene glycol acrylate phosphate.

6. The method according to claim 1, wherein the non-ionic monomer is at least one monomer selected from the group consisting of acrylamide or methacrylamide or derivatives thereof, $C_1$ to $C_{40}$ acrylic or methacrylic acid alkylesters, alkoxy-, aryloxy-, alkylaryloxy- or arylalkyloxy-acrylates or oxyalkyl, oxyaryl, oxyalkylaryl or oxyarylalkyl methacrylates (wherein the alkylene, arylene, alkylarylene or arylalkylene oxide number is between 1 and 120), vinyl acetate, vinylpyrrolidone, styrene or α-methylstyrene, and ethyl acrylamide or acrylate.

7. The method according to claim 1, wherein the alkoxy-, aryloxy-, alkylaryloxy- or arylalkyloxy-polyalkylene glycol urethane monomer is at least one monomer selected from the group consisting of reaction products of alkoxy-polyalkylene glycol with a polymerizable unsaturated isocyanate, and the reaction products of methoxy-polyethylene glycol with an acrylic, methacrylic, vinyl or allyl isocyanate.

8. The method according to claim 1, wherein the alkyloxy-, aryloxy-, alkylaryloxy- or arylalkyloxy-polyalkylene glycol acrylate or methacrylate is a methoxy-polyethylene glycol acrylate or methacrylate, and the polyethylene glycol has a molecular weight greater than 300.

9. The method according to claim 1, wherein the copolymer further comprises ethylenic monomers having at least two polymerizable double bonds selected from the group consisting of ethylene glycol dimethyacrylate, divinylacetylene, divinylbenzene, trimethylolpropanetriacrylate, allyl acrylate, methylene-bis-acrylamide, methylene-bis-methacrylamide, tetrallyloxyethane, triallylcyanurates, and allyl ethers prepared from polyols.

10. The method according to claim 9, wherein the polyols are selected from the group consisting of pentaerythritol, sorbitol, and sucrose.

11. The method according to claim 1, wherein the dispersing agent is fractionated subsequently to the polymerization step.

12. The method according to claim 1, wherein the dispersing agent is completely in the form of an acid.

13. The method according to claim 1, wherein the dispersing agent is partially or completely neutralized by one or more neutralization agents having a monovalent function or a polyvalent function.

14. The method according to claim 13, wherein the neutralization agents having a monovalent function are selected from the group consisting of compounds containing alkaline cations and primary or secondary aliphatic and/or cyclic amines.

15. The method according to claim 14, wherein the alkaline cations are selected from the group consisting of sodium, potassium, lithium, and ammonium.

16. The method according to claim 14, wherein the primary or secondary aliphatic and/or cyclic amines are selected from the group consisting of ethanolamines, mono- and diethylamine, and cyclohexylamine.

17. The method according to claim 13, wherein the neutralization agents having a polyvalent function are selected from the group consisting of compounds containing alkaline-earth divalent cations, compounds containing trivalent cations, and compounds containing cations with a higher valency.

18. The method according to claim 17, wherein the alkaline-earth divalent cations are selected from the group consisting of magnesium, calcium, and zinc, and the trivalent cation is aluminum.

19. The method according to claim 1, wherein the mineral filler is selected from the group consisting of natural calcium carbonate, precipitated calcium carbonate, barium carbonate, limy rocks, dolomite, talc, ground silica, silicas in general, fumed silica, fumed titanium dioxide, diatomites, iron oxides, manganese oxides, titanium dioxide, lime, kaolin, metakaolin, clays, mica, plasters, fly ash, slag, calcium sulphate, zeolites, basalt, barium sulphate, aluminum trihydroxide, and mixtures thereof.

20. The method according to claim 19, wherein the natural calcium carbonate is selected from the group consisting of chalk, calcite, and marble.

21. A cement matrix or hydraulic binder, prepared by mixing a cement or hydraulic binder with an aqueous dispersion comprising a mineral filler and a dispersing agent selected from the group consisting of copolymers prepared by the radical copolymerization of at least one alkoxy-, aryloxy-, alkylaryloxy- or arylalkyloxy-polyalkylene glycol ethylenic urethane monomer with at least one anionic monomer; at least one non-ionic monomer; and at least one alkoxy-, aryloxy-, alkylaryloxy- or arylalkyloxy-polyalkylene glycol acrylate or methacrylate or an alkyloxy-, aryloxy-, alkylaryloxy- or arylalkyloxy-polyalkylene glycol allyl ether.

22. The cement matrix or hydraulic binder according to claim 21, wherein the urethane monomer is an alkoxy-polyethylene glycol urethane.

23. The cement matrix or hydraulic binder according to claim 21, wherein the copolymer further comprises ethylenic monomers having at least two polymerizable double bonds.

24. The cement matrix or hydraulic binder according to claim 21, wherein the dispersing agent is a copolymer comprising:
  a) 1% to 50% by weight of one or more anionic monomers;
  b) 2% to 65% by weight of one or more non-ionic monomers;
  c) 3% to 65% by weight of an alkoxy-, aryloxy-, alkylaryloxy- or arylalkyloxy-polyalkylene glycol ethylenic urethane monomer;
  d) 0% to 90% by weight of an alkyloxy-, aryloxy-, alkylaryloxy- or arylalkyloxy-polyalkylene glycol acrylate or methacrylate, or an alkoxy-, aryloxy-, alkylaryloxy- or arylalkyloxy-polyalkylene glycol allyl ether;
  e) 0% to 5% by weight of one or more cross-linking agents; and
  the total of monomers a), b), c), d) and e) is equal to 100%.

25. The cement matrix or hydraulic binder according to claim 21, wherein the anionic monomer is at least one monomer selected from the group consisting of acrylic acid, methacrylic acid, 2-acrylamido-2-methyl-1-propane sulphonic acid, 2-methacrylamido-2-methyl-1-propane sulphonic acid, 3-methacrylamido-2-hydroxy-1-propane sulphonic acid, allylsulphonic acid, methallylsulphonic acid, allyloxybenzene sulphonic acid, methallyloxybenzene sulphonic acid, 2-hydroxy-3-(2-propenyloxy)propane sulphonic acid, 2-methyl-2-propene-1-sulphonic acid, ethylene sulphonic acid, propene sulphonic acid, 2-methyl propene sulphonic acid, styrene sulphonic acid, vinyl sulphonic acid, sodium methallylsulphonate, sulphoethyl or sulphopropyl acrylate or methacrylate, sulphomethylacrylamide, sulphomethylmethacrylamide, ethylene glycol methacrylate phosphate, and ethylene glycol acrylate phosphate.

26. The cement matrix or hydraulic binder according to claim 21, wherein the non-ionic monomer is at least one monomer selected from the group consisting of acrylamide or methacrylamide or derivatives thereof, $C_1$ to $C_{40}$ acrylic or methacrylic acid alkyl-esters, alkoxy-, aryloxy-, alkylaryloxy- or arylalkyloxy-acrylates or oxyalkyl, oxyaryl, oxyalkylaryl or oxyarylalkyl methacrylates (wherein the alkylene, arylene, alkylarylene or arylalkylene oxide number is between 1 and 120), vinyl acetate, vinylpyrrolidone, styrene or a-methylstyrene, and ethyl acrylamide or acrylate.

27. The cement matrix or hydraulic binder according to claim 21, wherein the alkoxy-, aryloxy-, alkylaryloxy- or arylalkyloxy-polyalkylene glycol urethane monomer is at least one monomer selected from the group consisting of reaction products of alkoxy-polyalkylene glycol with a polymerizable unsaturated isocyanate, and the reaction products of methoxy-polyethylene glycol with an acrylic, methacrylic, vinyl or allyl isocyanate.

28. The cement matrix or hydraulic binder according to claim 21, wherein the alkyloxy-, aryloxy-, alkylaryloxy- or arylalkyloxy-polyalkylene glycol acrylate or methacrylate is a methoxy-polyethylene glycol acrylate or methacrylate, and the polyethylene glycol has a molecular weight greater than 300.

29. The cement matrix or hydraulic binder according to claim 21, wherein the copolymers further comprise ethylenic monomers having at least two polymerizable double bonds selected from the group consisting of ethylene glycol dimethyacrylate, divinylacetylene, divinylbenzene, trimethylolpropanetriacrylate, allyl acrylate, methylene-bis-acrylamide, methylene-bis-methacrylamide, tetrallyloxyethane, triallylcyanurates, and allyl ethers prepared from polyols.

30. The cement matrix or hydraulic binder according to claim 29, wherein the polyols are selected from the group consisting of pentaerythritol, sorbitol, and sucrose.

31. The cement matrix or hydraulic binder according to claim 21, wherein the dispersing agent is completely in the form of an acid.

32. The cement matrix or hydraulic binder according to claim 21, wherein the dispersing agent is partially or completely neutralized by one or more neutralization agents having a monovalent function or a polyvalent function.

33. The cement matrix or hydraulic binder according to claim 32, wherein the neutralization agents having a monovalent function are selected from the group consisting of compounds containing alkaline cations and primary or secondary aliphatic and/or cyclic amines.

34. The cement matrix or hydraulic binder according to claim 33, wherein the alkaline cations are selected from the group consisting of sodium, potassium, lithium, and ammonium.

35. The cement matrix or hydraulic binder according to claim 33, wherein the primary or secondary aliphatic ardor cyclic amines are selected from the group consisting of ethanolamines, mono- and diethylamine, and cyclohexylamine.

36. The cement matrix or hydraulic binder according to claim 32, wherein the neutralization agents having a polyvalent function are selected from the group consisting of compounds containing alkaline-earth divalent cations, compounds containing trivalent cations, and compounds containing cations with a higher valency.

37. The cement matrix or hydraulic binder according to claim 36, wherein the alkaline-earth divalent cations are selected from the group consisting of magnesium, calcium, and zinc, and the trivalent cation is aluminum.

38. The cement matrix or hydraulic binder according to claim 21, wherein the mineral filler is selected from the group consisting of natural calcium carbonate, precipitated calcium carbonate, barium carbonate, limy rocks, dolomite, talc, ground silica, silicas in general, fumed silica, fumed titanium dioxide, diatomites, iron oxides, manganese oxides, titanium dioxide, lime, kaolin, metakaolin, clays, mica, plasters, fly ash, slag, calcium sulphate, zeolites, basalt, barium sulphate, aluminium trihydroxide, and mixtures thereof.

39. The cement matrix or hydraulic binder according to claim 38, wherein the natural calcium carbonate is selected from the group consisting of chalk, calcite, and marble.

40. A concrete prepared by the method of claim 1.

41. A mortar prepared by the method of claim 1.

42. A hydraulic concrete prepared by the method of claim 1.

43. A grout prepared by the method of claim 1.

44. A composition based on cement and/or calcium sulphate hemihydrate prepared by the method of claim 1.

45. A concrete comprising the cement matrix or hydraulic binder of claim 21.

46. A mortar comprising the cement matrix or hydraulic binder of claim 21.

47. A hydraulic concrete comprising the cement matrix or hydraulic binder of claim 21.

48. A grout comprising the cement matrix or hydraulic binder of claim 21.

49. A composition based on cement and/or calcium sulphate hemihydrate comprising the cement matrix or hydraulic binder of claim 21.

50. A building comprising the cement matrix or hydraulic binder of claim 21.

51. A bridge comprising the cement matrix or hydraulic binder of claim 21.

52. A road comprising the cement matrix or hydraulic binder of claim 21.

53. An offshore construction comprising the cement matrix or hydraulic binder of claim 21.

54. A petroleum cement comprising the cement matrix or hydraulic binder of claim 21.

* * * * *